(No Model.)
H. A. HUNTINGTON.
OPTOMETER.
No. 534,156. Patented Feb. 12, 1895.
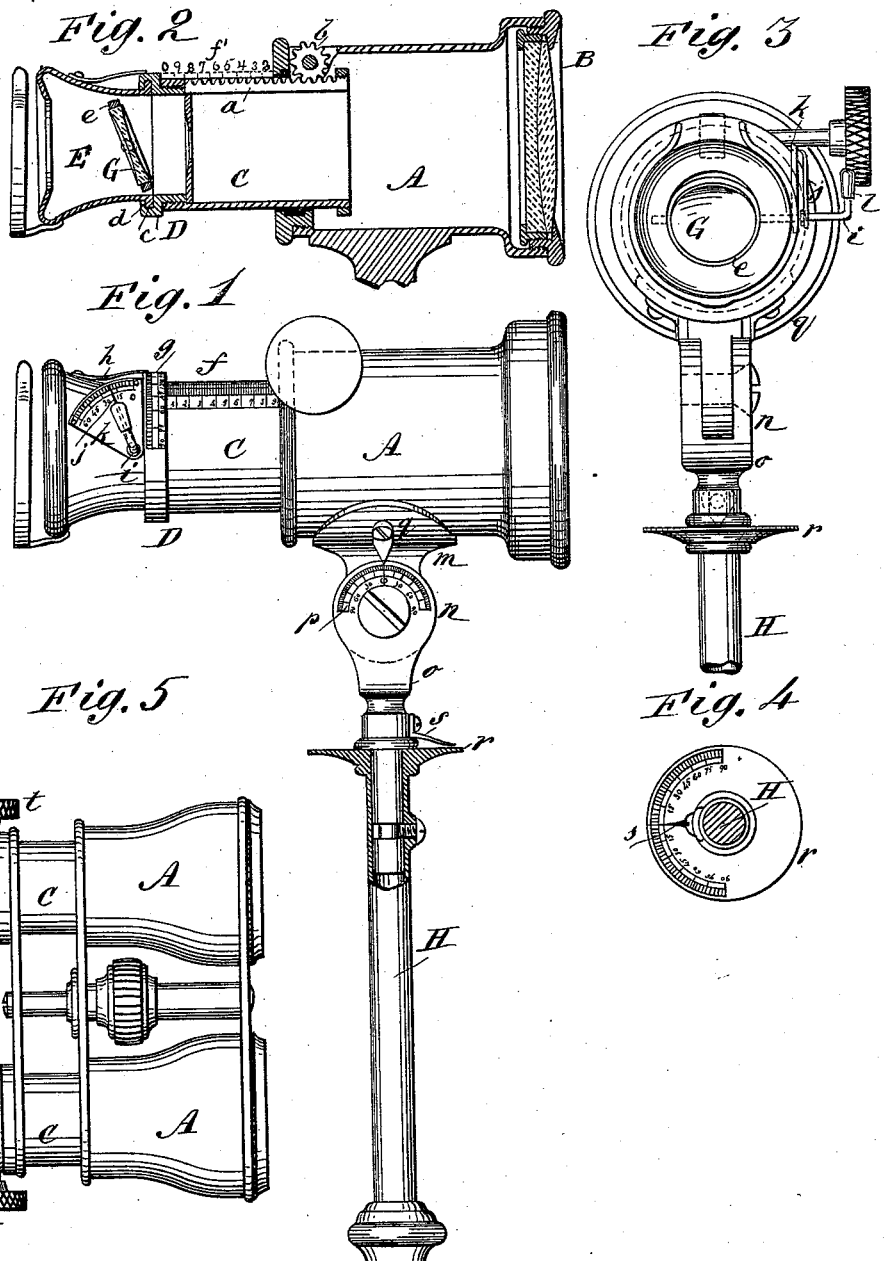

UNITED STATES PATENT OFFICE.

HOMER A. HUNTINGTON, OF BOSTON, MASSACHUSETTS, ASSIGNOR TO HIMSELF AND ANGUS G. McKENZIE, OF SAME PLACE.

OPTOMETER.

SPECIFICATION forming part of Letters Patent No. 534,156, dated February 12, 1895.

Application filed December 28, 1893. Serial No. 494,929. (No model.)

*To all whom it may concern:*

Be it known that I, HOMER A. HUNTINGTON, of Boston, in the county of Suffolk and State of Massachusetts, have invented a new and Improved Optometer, of which the following is a specification, reference being had to the annexed drawings, forming a part thereof, in which—

Figure 1 is a side elevation, partly in section, of my improved optometer. Fig. 2 is a longitudinal section of the lens tube. Fig. 3 is an end elevation of the upper portion of the instrument. Fig. 4 is a plan view of the scale surrounding the vertical axis. Fig. 5 is a plan view of an opera glass constructed according to my improvement.

Similar letters of reference indicate corresponding parts in all the views.

The object of my invention is to construct an optical instrument for quickly and accurately diagnosing errors of refraction in the human eye.

It is adapted for various optical tests, but more particularly designed and adapted for determining and correcting astigmatism.

The construction and manner of using the instrument are as hereinafter described.

The main tube A of the optometer carries in its anterior end an achromatic telescope objective B, preferably of short focus, and to the posterior end of said tube is fitted a draw tube C, provided with a rack $a$ which is operated by a pinion $b$ journaled in the tube A. To the front of the draw tube C is fitted a rim D, having an internal groove $c$ which receives the flange $d$ of the eye-piece E, the said flange being fitted loosely to the groove in the rim D, so that the eye-piece may be turned on its axis. In the eye-piece E, and preferably a short distance within the posterior end thereof is journaled a lens frame $e$ so that it may be turned on an axis at right angles to the axis of the draw tube C.

The draw tube C is provided with a scale $f$ to indicate the degree of extension of the tube. The rim D is furnished with a scale $g$, and the eye-piece E is provided with an index $h$ which extends over the said scale $g$, the index and scale serving to show the angular displacement of the eye-piece, and a prolongation $i$ of the axis of the lens frame $e$ is furnished with an index $j$, which moves in front of a sector-shaped scale $k$ attached to the side of the eye-piece. The extremity of the axis $i$ is provided with a small handle $l$.

To the lens frame $e$ is fitted a negative lens G, of suitable power to act with the objective B as a telescope. The main tube A is mounted on a short arm $m$, connected by a joint $n$ with a spindle $o$ arranged to turn in a standard H. The joint $n$ is provided with a scale $p$, and the arm $m$ carries an index $q$, which extends over the scale $p$ on the joint $n$. To the top of the standard H is affixed a scale $r$, and to the spindle $o$ is secured an index $s$ which moves over the scale $r$.

The test glasses used in connection with the instrument consist of a $+10$ and a $-10$ for correcting high degrees of error. Either of these lenses may be inserted in the lens-holding spring. In Fig. 5, I have shown an opera glass having two main tubes, two draw tubes, and two sets of lenses arranged in the manner already described in connection with Figs. 1 and 2. The axis $i$ of the tilting lens G in this case is provided with a milled head $t$, by which it may be turned, and the scales are omitted.

I will describe the method of using the instrument for making various tests.

In making a test for hypermetropia, I close the instrument shown in Fig. 1, so that the scale $f$ indicates zero. I then open it to the greatest extent which will allow the patient to read the distant types, and put down the amount as manifest hypermetropia.

In the test for simple hypermetropic astigmatism I adjust the instrument as for hypermetropia, when the hypermetropic meridian will be made emmetropic and the emmetropic will be made myopic. Correct this latter defect by tilting the lens, G, with its diametric axis at right angles to the meridian of the myopic astigmatism thus produced. The index, $j$, will indicate on the scale, $k$, the amount.

For compound hypermetropic astigmatism, select the most hypermetropic meridian, and correct it as in the case of simple hypermetropia. Then correct the artificial myopic condition thus produced, by tilting the eye piece, or lens, G, as described in the preceding paragraph.

While it is practicable to employ a single telescopic tube for all proposed tests, I prefer, chiefly for convenience, to employ two, which are similar in their main or most essential features, and arranged parallel. In such case, one such tube, say the one shown in Fig. 2, is particularly adapted for making the test for myopia—that is to say, it is provided with an auxiliary minus (—) lens, or one which is much stronger than the corresponding lens in the other parallel tube.

In Fig. 2, the draw-tube, C, is provided with a scale $f'$, to indicate the adjustment of the draw-tube, or, in other words, to indicate the distance between the object-glass, B, and lens, G; but it will be observed the said scale reads from right to left, or opposite to the scale, $f$, in Fig. 1.

In making the test for myopia, the instrument (Fig. 2) is first opened to its fullest extent, or until the scale, $f'$, indicates zero, and then closed as far as permitted by the normal vision of the patient.

For simple myopic astigmatism; with the scale $f$ on the draw tube C' indicating zero, and the axis of the eye piece at right angles to the astigmatic meridian, tilt the lens G until the patient's vision is normal.

For compound myopic astigmatism; correct the meridian of least astigmatism, and then, by tilting the lens, G, correct the meridian at right angles to that of the meridian of least astigmatism.

For mixed astigmatism; correct by the rules for simple hypermetropic astigmatism, first making one meridian emmetropic, thus converting the case into one of simple myopic astigmatism.

In carrying out my invention, I intend applying it not only for the purposes above indicated, but also in other practical and strictly commercial ways, for example, in an opera glass, as shown in Fig. 5.

By the mere addition of the scales, $p$ and $r$, (Fig. 1,) to the standard of the instrument, it is adapted for testing dis-equilibrium of the ocular muscles, and thus dispenses with the necessity of using prisms for that purpose. In this test, one eye of the patient is directed through the instrument at the object, e. g., a circle, and sees it magnified, while with his other uncovered eye he sees the same object of its natural size, equilibrium of his ocular muscles being demonstrated when the smaller circle seen with his natural eye seems to him to lie centrally within the larger circle seen through the instrument, scales $p$ and $r$ both standing at zero.

If the circles are not so seen, the movements of the telescope in its horizontal and vertical planes necessary to make the circles so appear, are seen at scales $p$ and $r$ where their prismatic value is read.

My optometer obviates the necessity of using a multiplicity of lenses, and enables the optician to make all necessary tests with a single, simple instrument, which is perfectly accurate and comparatively inexpensive.

Having thus described my invention, I claim as new and desire to secure by Letters Patent—

1. An optometer, comprising a suitable lens support, and a lens which is pivoted therein on a diametric axis, i. e., on an axis at right angles to its principal optical axis, whereby it is adapted to be tilted and placed at different inclinations, or angles, to the line of vision, corresponding to the existing abnormal refraction, and means for indicating the lenticular, astigmatic corrections required, as specified.

2. In an instrument for correcting astigmatism, the combination with a suitable lens support, of a lens which is rotatable about its principal axis, and also pivoted on a diametric axis, or axis at right angles to said principal optical axis, substantially as shown and described.

3. In an improved optometer, a suitable lens support, a lens arranged to turn on an axis co-incident with its principal optical axis, and rotatable on a diametric axis, or one which is at right angles to such principal optical axis, and two scales arranged as shown, one for indicating the angle formed by the plane of the lens with the line of vision, the other scale being for indicating the angular displacement of the lens in a vertical plane, as and for the purposes specified.

4. The improved optometer, comprising a two-part telescopic tube, an object glass, and a lens, which is rotatable on an axis coincident with its principal optical axis, and also rotatable on a diametric axis, i. e., an axis which is at right angles to such principal optical axis, substantially as shown and described.

HOMER A. HUNTINGTON.

Witnesses:
FREDERICK A. DAVIS,
WILEY P. SWIFT.